United States Patent [19]

Belart et al.

[11] 4,244,278

[45] Jan. 13, 1981

[54] ARRANGEMENT FOR A HYDRAULIC BRAKE BOOSTER

[75] Inventors: Juan Belart, Walldorf; Jochen Burgdorf, Offenbach, both of Fed. Rep. of Germany

[73] Assignee: ITT Industries, Inc., New York, N.Y.

[21] Appl. No.: 28,471

[22] Filed: Apr. 9, 1979

[30] Foreign Application Priority Data

May 10, 1978 [DE] Fed. Rep. of Germany ....... 2820342

[51] Int. Cl.$^3$ ............................................. F15B 11/10
[52] U.S. Cl. ........................................ 91/468; 91/433; 60/547 A; 251/63.4
[58] Field of Search .................... 91/433, 442, 468; 60/547 A; 251/63.4

[56] References Cited

U.S. PATENT DOCUMENTS

| | | | |
|---|---|---|---|
| 2,342,812 | 2/1944 | Martinson | 91/433 X |
| 3,737,603 | 6/1973 | Kish et al. | 251/63.4 X |
| 3,937,127 | 2/1976 | Baker et al. | 91/433 X |
| 4,007,665 | 2/1977 | Orzel | 91/433 X |

FOREIGN PATENT DOCUMENTS 2360133  6/1974  Fed. Rep. of Germany .

*Primary Examiner*—Robert L. Bleutge
*Attorney, Agent, or Firm*—John T. O'Halloran; Alfred C. Hill

[57] ABSTRACT

An arrangement for a hydraulic brake booster through which a pump-circulated fluid is throttled for supplying fluid to the brake booster includes a throttle element which is actuated by the booster pressure through a control spring. The control spring and a piston associated therewith limits the maximum amount of pressure that can be throttled so that a separate pressure-limiting valve, for instance, is not necessary.

37 Claims, 1 Drawing Figure

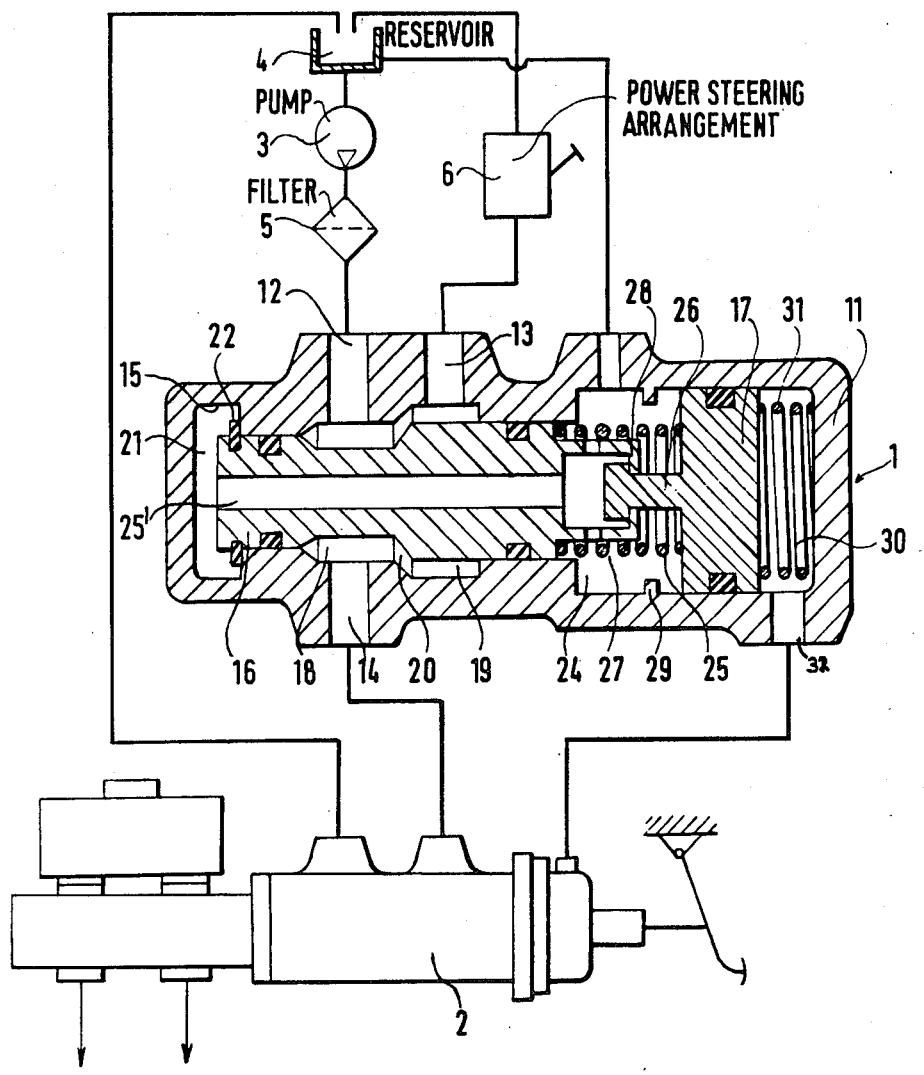

ARRANGEMENT FOR A HYDRAULIC BRAKE BOOSTER

BACKGROUND OF THE INVENTION

The present invention relates to an arrangement for a hydraulic brake booster including a booster chamber permitting the controlled delivery of fluid thereto from an auxiliary source of pressure-transmitting fluid, wherein the auxiliary source is a pump supplying a pump-circulated fluid to be throttled by a throttle element, and the throttle element is actuatable by the pressure in the booster chamber in addition to being loaded by a weak spring, and wherein an arrangement is provided for limiting the maximum amount of pressure that can be throttled. Such an arrangement is known from German Pat. No. DE-AS 2,360,133.

In the known arrangement, the throttle element is directly acted upon in the actuating direction by the pressure prevailing in the booster chamber, and the action of the weak spring causes continuous throttling of a predetermined pressure in the pump-circulated fluid, which pressure is somewhat higher than the pressure in the booster chamber. As a result, when the brake pedal is depressed vehemently, an ever increasing pressure can be built up in the booster chamber which is ultimately limited to a maximum value by the added provision of a pressure-limiting valve in order to avoid damage to the brake system. It is a disadvantage in this known arrangement that the necessary pressure-limiting valve requires a relatively complicated construction. Further, the control movements of the throttle element are transmitted to the booster chamber as a result of the direct hydraulic application, because for the throttle element to be acted upon by pressure it is necessary to feed or withdraw low quantities of fluid continuously. This causes vibrations in the booster chamber which may resonate and, thus, disturb the braking action substantially.

SUMMARY OF THE INVENTION

An object of the present invention is to provide an improved arrangement for a hydraulic brake booster of the type referred to hereinabove that does not require an additional pressure-limiting valve to throttle a predetermined maximum pressure and that does not transmit the control movements of the throttle element directly to the fluid in the booster chamber.

A feature of the present invention is the provision of an arrangement for a hydraulic brake booster including a booster chamber, the arrangement permitting a controlled delivery of a pump-circulated pressure-transmitting fluid to the booster chamber, the arrangement comprising: a housing having a stepped bore; a throttle element slidably sealed in the bore; a piston slidably sealed in the bore adjacent one end of the throttle element and acted upon by pressure in the booster chamber in an actuating direction toward the throttle element, the piston being displaceable within limits; and a control spring disposed in the bore between the one end of the throttle element and an adjacent end of the piston to determine the maximum force transmitted from the piston to the throttle element.

Because the throttle element receives a maximum force determined by the control spring, a predetermined pressure can be throttled in the pump-circulated fluid without the requirement for additional measures. Also, the presence of the interposed control spring provides for cushioned transmittal of the throttle element's control movements to the fluid in the booster chamber, and, thereby, substantially prevents the occurrence of vibrations disturbing the braking action.

It will be an advantage to provide a stop formed in the housing against which the piston may bear in the actuating direction. This eliminates disturbing vibrations completely because the piston is urged against the stop when the pressure build-up in the booster chamber commences and is disengaged from the stop and moved back again only on termination of the braking action.

If the end of the piston remote from the throttle element is acted upon in the actuating direction by the weak spring and the piston is anchored to the throttle element in such a manner to allow a predetermined relative movement between the piston and the throttle element, which is necessary for the control of the throttle's cross section, a very compact construction is achieved. In this arrangement, the piston is required to overcome short distances only so that the quantity of fluid necessary for pressure application is low. Because the piston surface exposed to the pressure in the booster chamber is a multiple larger than the piston surface at the throttle element which is acted upon by the throttled pressure, it is possible to throttle the full pressure determined by the control spring in the pump-circulated fluid at a moment when the pressure in the booster chamber is still low. This permits a faster delivery of a high pressure metered into the booster chamber than would be the case if the throttled pressure is always only slightly higher than the pressure in the booster chamber. Thus, it is possible to apply the connected brakes more quickly.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of an arrangement for a brake booster of the type referred to hereinabove in accordance with the principles of the present invention.

DESCRIPTION OF THE PREFERRED EMBODIMENT

In the FIGURE, reference numeral 1 designates a unit in which a pump-circulated fluid may be throttled. A hydraulic brake booster is identified by reference numeral 2 and is connected to an outlet port 14 of unit 1 through a conduit. Brake booster 2 communicates with a reservoir 4 through a return line. A pump 3 draws fluid from reservoir 4 feeding it to an inlet port 12 of unit 1 through a filter 5. An outlet port 13 of unit 1 communicates with reservoir 4 through a power steering arrangement 6.

Unit 1 includes a housing 11 having a stepped bore 15 accommodating a throttle slide 16 and a piston 17 slidable therein. Throttle slide 16 and bore 15 are stepped such that an annular chamber 18 communicating with inlet port 12 and outlet port 14 and an annular chamber 19 communicating with outlet port 13 are formed. Intermediate annular chambers 18 and 19, an annular throttle cross section 20 of throttle slide 16 is provided. On the left of annular chamber 18 and on the right of annular chamber 19, throttle slide 16 is sealed and displaceably guided in bore 15.

Throttle slide 16 extends to the left into a chamber 21 and has on this end a stop ring 22 which limits its movement to the right. Towards the right, throttle slide 16 extends into a chamber 24 which is bounded by the adjacent end of piston 17. Chamber 24 is in unpressurized fluid communication with reservoir 4 below the latter's fluid level so that chamber 24 is always filled with unpressurized fluid. Throttle slide 16 has a passage bore 25' providing a communication between chamber 24 and chamber 21.

In chamber 24, a control spring 25 is engaged between piston 17 and throttle slide 16. Piston 17 has a mushroom-shaped projection 26 which extends into a sleeve 27 fitted to throttle slide 16 and is anchored therein by a radially inwardly directed stop 28 so as to permit only a predetermined relative movement between piston 17 and throttle slide 16. Further, chamber 24 accommodates a stop 29 formed in housing 11 to limit the movement of piston 17 in the direction of throttle slide 16 and, thus, in the actuating direction.

The end of piston 17 remote from chamber 24 forms a boundary for a control chamber 30 which communicates with a booster chamber of brake booster 2 through a conduit coupled to inlet 32 of chamber 30. Control chamber 30 houses a weak spring 31 bearing on piston 17 towards the left.

The mode of operation of unit 1 is described below. With the brakes not actuated, all parts are in their illustrated positions.

Pump 3 delivers fluid from reservoir 4 through filter 5 and inlet port 12 into annular chamber 18. From chamber 18, the fluid flows through throttle cross section 20 to annular chamber 19 and onwards through outlet port 13 and power steering arrangement 6 back to reservoir 4. This pump-circulated fluid is slightly throttled at throttle cross section 20 so that a slight overpressure prevails in annular chamber 18. If this should not be achieved with throttle slide 16 in the illustrated position because the circulation of fluid is too low, weak spring 31 will displace piston 17 and, thus, via control spring 25, will displace throttle slide 16 to the left by such an amount as to ensure throttling of the low overpressure in annular chamber 18. With the brake not applied, control chamber 30 is unpressurized because in that instance the booster chamber of the brake booster 2 is in communication with the reservoir as is known.

Only when the brakes are applied, i.e., the brake booster 2 is activated, will pressurized fluid arriving from annular chamber 18 be fed into the booster chamber and, thus, into control chamber 30. The piston 17 is thereby displaced to the left into abutment with stop 29 formed in housing 11. Through control spring 25, throttle slide 16 is likewise acted upon to the left so as to cause throttling, at throttle cross section 20, of a pressure in the pump-circulated fluid which is determined by control spring 25. However, if, as a result of an actuation of power steering arrangement 6, such a control pressure is already present in the pump-circulated fluid, this control pressure will act upon throttle slide 16 against control spring 25, so that in that case there occurs no additional throttling of the pump-circulated fluid which would unnecessarily increase the load on pump 3.

Following termination of the braking action, control chamber 30 again becomes unpressurized since the fluid is discharged through the booster chamber of brake booster 2. All parts of unit 1 thereby reassume their illustrated position or a position which is merely determined by weak spring 31, and only a stand-by pressure is throttled again in the pump-circulated fluid.

While we have described above the principles of our invention in connection with specific apparatus it is to be clearly understood that this description is made only by way of example and not as a limitation to the scope of our invention as set forth in the objects thereof and in the accompanying claims.

We claim:

1. An arrangement for a hydraulic brake booster including a booster chamber, said arrangement permitting a controlled delivery of a pump-circulated pressure-transmitting fluid to said booster chamber, said arrangement comprising:
   a housing having a stepped bore;
   a throttle element slidably sealed in said bore;
   a piston slidably sealed in said bore adjacent one end of said throttle element and acted upon by pressure in said booster chamber in an actuating direction toward said throttle element, said piston being displaceable within limits relative to said throttle element; and
   a control spring disposed in said bore between said one end of said throttle element and an adjacent end of said piston to determine the maximum force transmitted from said piston to said throttle element.

2. An arrangement according to claim 1, wherein said piston bears against a stop formed in said bore between said one end of said throttle element and said adjacent end of said piston when said booster is actuated.

3. An arrangement according to claim 2, wherein the other end of said piston is acted upon in said actuating direction by a weak spring.

4. An arrangement according to claim 3, wherein said adjacent end of said piston and said one end of said throttle element are interconnected by a connecting means allowing a predetermined relative movement between said piston and said throttle means for controlling said delivery of said pump-circulated fluid.

5. An arrangement according to claim 4, wherein said connecting means includes
   a mushroom-shaped projection extending from said adjacent end of said piston, and
   a sleeve extending from said one end of said throttle element, said sleeve extending over said projection and having an inwardly directed portion to engage the larger end of said projection.

6. An arrangement according to claim 4, wherein said throttle element is a throttle slide throttling said pump-circulated fluid at an annular cross section of said throttle slide.

7. An arrangement according to claim 6, further including
   a chamber disposed in said bore between said one end of said throttle element and said adjacent end of said piston, said chamber being filled with an unpressurized pressure-transmitting fluid and in communication with an unpressurized pressure-transmitting fluid reservoir below the fluid level thereof.

8. An arrangement according to claim 7, wherein said throttle element includes
   a surface acted upon by pressure in said pump-circulated fluid in opposition to said actuating direction.

9. An arrangement according to claim 8, wherein said surface is a step in said throttle element for controlling the throttling of said throttle element.

10. An arrangement according to claim 8, wherein the area of said other end of said piston is a multiple larger than the area of said surface.

11. An arrangement according to claim 1, wherein the other end of said piston is acted upon in said actuating direction by a weak spring.

12. An arrangement according to claim 11, wherein said adjacent end of said piston and said one end of said throttle element are interconnected by a connecting means allowing a predetermined relative movement between said piston and said throttle means for controlling said delivery of said pump-circulated fluid.

13. An arrangement according to claim 12, wherein said connecting means includes
a mushroom-shaped projection extending from said adjacent end of said piston, and
a sleeve extending from said one end of said throttle element, said sleeve extending over said projection and having an inwardly directed portion to engage the larger end of said projection.

14. An arrangement according to claim 12, wherein said throttle element is a throttle slide throttling said pump-circulated fluid at an annular cross section of said throttle slide.

15. An arrangement according to claim 14, further including
a chamber disposed in said bore between said one end of said throttle element and said adjacent end of said piston, said chamber being filled with an unpressurized pressure-transmitting fluid and in communication with an unpressurized pressure-transmitting fluid reservoir below the fluid level thereof.

16. An arrangement according to claim 15, wherein said throttle element includes
a surface acted upon by pressure in said pump-circulated fluid in opposition to said actuating direction.

17. An arrangement according to claim 16, wherein said surface is a step in said throttle element for controlling the throttling of said throttle element.

18. An arrangement according to claim 16, wherein the area of said other end of said piston is a multiple larger than the area of said surface.

19. An arrangement according to claim 1, wherein said adjacent end of said piston and said one end of said throttle element are interconnected by a connecting means allowing a predetermined relative movement between said piston and said throttle means for controlling said delivery of said pump-circulated fluid.

20. An arrangement according to claim 19, wherein said connecting means includes
a mushroom-shaped projection extending from said adjacent end of said piston, and
a sleeve extending from said one end of said throttle element, said sleeve extending over said projection and having an inwardly directed portion to engage the larger end of said projection.

21. An arrangement according to claim 19, wherein said throttle element is a throttle slide throttling said pump-circulated fluid at an annular cross section of said throttle slide.

22. An arrangement according to claim 21, further including
a chamber disposed in said bore between said one end of said throttle element and said adjacent end of said piston, said chamber being filled with an unpressurized pressure-transmitting fluid and in communication with an unpressurized pressure-transmitting fluid reservoir below the fluid level thereof.

23. An arrangement according to claim 22, wherein said throttle element includes
a surface acted upon by pressure in said pump-circulated fluid in opposition to said actuating direction.

24. An arrangement according to claim 23, wherein said surface is a step in said throttle element for controlling the throttling of said throttle element.

25. An arrangement according to claim 23, wherein the area of said other end of said piston is a multiple larger than the area of said surface.

26. An arrangement according to claim 1, wherein said throttle element is a throttle slide throttling said pump-circulated fluid at an annular cross section of said throttle slide.

27. An arrangement according to claim 26, further including
a chamber disposed in said bore between said one end of said throttle element and said adjacent end of said piston, said chamber being filled with an unpressurized pressure-transmitting fluid and in communication with an unpressurized pressure-transmitting fluid reservoir below the fluid level thereof.

28. An arrangement according to claim 27, wherein said throttle element includes
a surface acted upon by pressure in said pump-circulated fluid in opposition to said actuating direction.

29. An arrangement according to claim 28, wherein said surface is a step in said throttle element for controlling the throttling of said throttle element.

30. An arrangement according to claim 28, wherein the area of said other end of said piston is a multiple larger than the area of said surface.

31. An arrangement according to claim 1, further including
a chamber disposed in said bore between said one end of said throttle element and said adjacent end of said piston, said chamber being filled with an unpressurized pressure-transmitting fluid and in communication with an unpressurized pressure-transmitting fluid reservoir below the fluid level thereof.

32. An arrangement according to claim 31, wherein said throttle element includes
a surface acted upon by pressure in said pump-circulated fluid in opposition to said actuating direction.

33. An arrangement according to claim 32, wherein said surface is a step in said throttle element for controlling the throttling of said throttle element.

34. An arrangement according to claim 32, wherein the area of said other end of said piston is a multiple larger than the area of said surface.

35. An arrangement according to claim 1, wherein said throttle element includes
a surface acted upon by pressure in said pump-circulated fluid in opposition to said actuating direction.

36. An arrangement according to claim 35, wherein said surface is a step in said throttle element for controlling the throttling of said throttle element.

37. An arrangement according to claim 35, wherein the area of said other end of said piston is a multiple larger than the area of said surface.

* * * * *